Oct. 20, 1936.  P. F. MARSELLA ET AL  2,058,091
GLASS CUTTING APPLIANCE
Filed Nov. 20, 1934  2 Sheets-Sheet 1
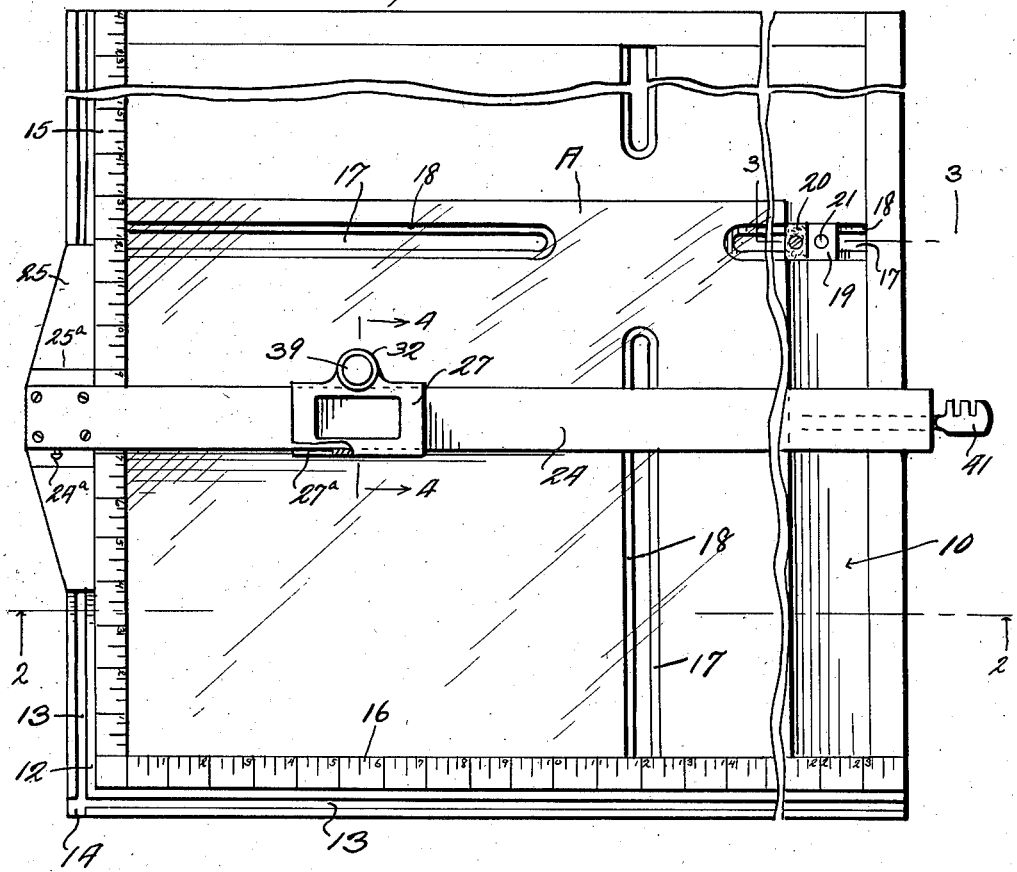
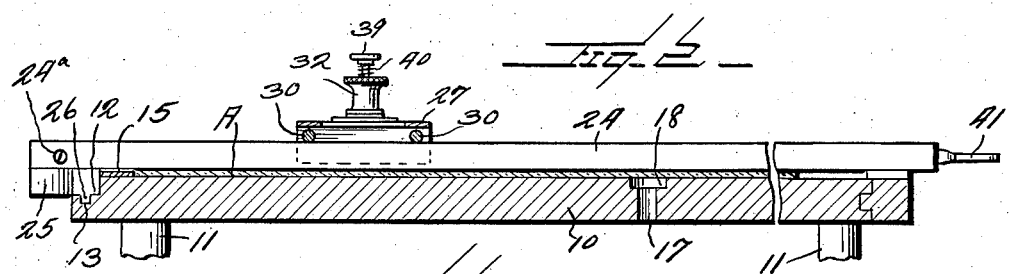
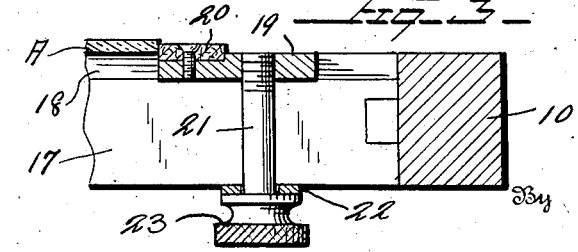
Inventors
P. F. Marsella
F. Marsella
By Watson E. Coleman
Attorney

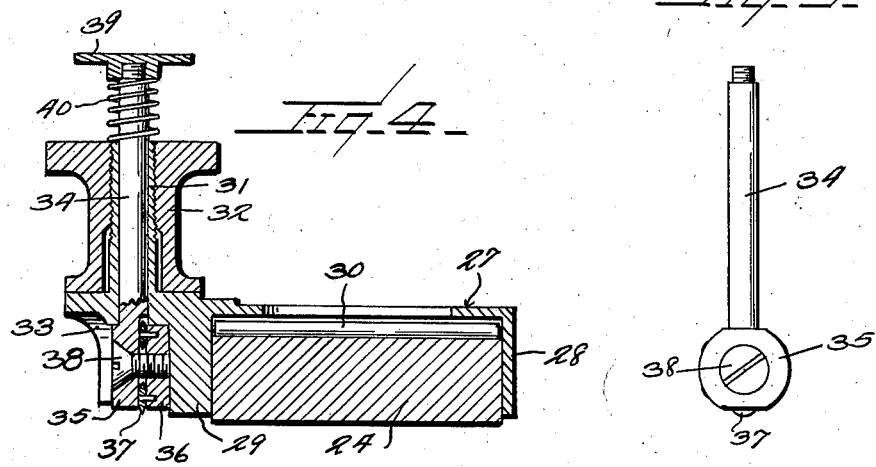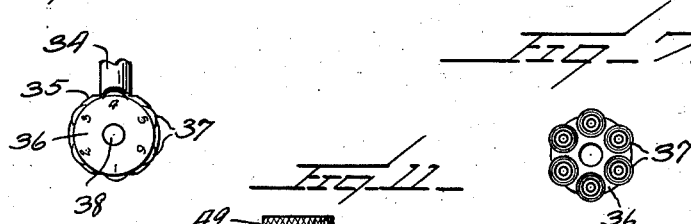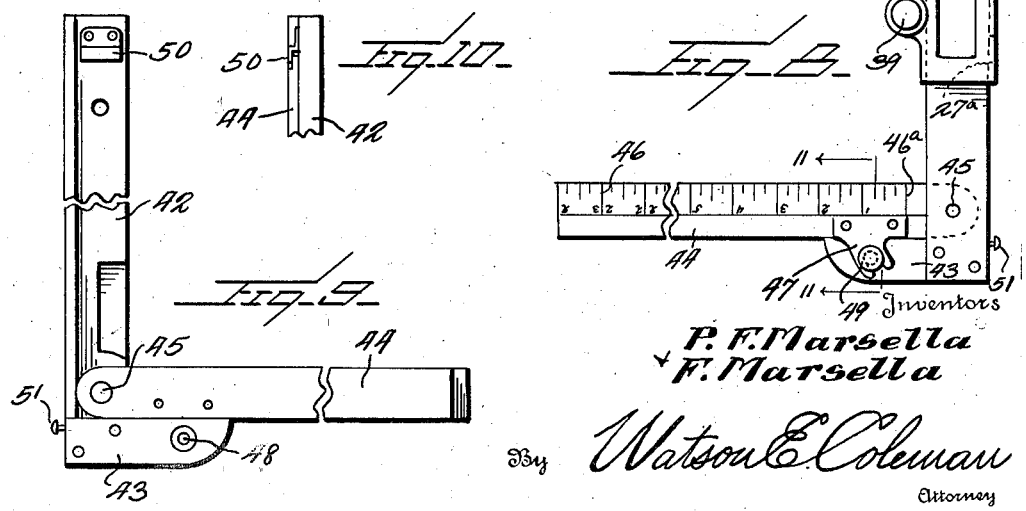

Patented Oct. 20, 1936

2,058,091

UNITED STATES PATENT OFFICE 2,058,091

GLASS CUTTING APPLIANCE

Philip F. Marsella and Ferdinando Marsella, Seneca Falls, N. Y.

Application November 20, 1934, Serial No. 753,984

4 Claims. (Cl. 33—32)

This invention relates to devices for cutting glass and particularly to a glass cutting mechanism which includes a straight edge and a slide movable along the straight edge and carrying a depressible glass cutter and which includes further a scale disposed at right angles to the straight edge and which is designed to be used, of course, to indicate the point at which the cut is to be made.

A further object is to provide a glass cutter in which a plurality of cutting elements are provided, mounted upon a rotatively adjustable carrier, so that when one glass cutting element becomes dull, the carrier may be rotated to bring another glass cutting element into position for operation.

A further object is to provide a glass cutting table, a straight edge in the form of a T-square, movable along the table, the table having two graduated scales at right angles to each other whereby the straight edge may be shifted to cut the glass to the proper size, said straight edge being provided with a slidable glass cutter thereon and the table having clamping means which may be used when necessary to clamp the sheets of glass in place on the table for cutting.

Other objects will appear in the course of the following description.

Our invention is illustrated in the accompanying drawings, wherein:—

Figure 1 is a top plan view of a glass cutting table constructed in accordance with our invention and showing the straight edge in place for use;

Figure 2 is a section on the line 2—2 of Figure 1;

Figure 3 is a fragmentary section on the line 3—3 of Figure 1;

Figure 4 is an enlarged section on the line 4—4 of Figure 1;

Figure 5 is a face elevation of the spindle which carrier the glass cutter;

Figure 6 is a fragmentary rear elevation of the lower end of this spindle and of the cutter carrier;

Figure 7 is a face view of the cutter carrier;

Figure 8 is a plan view of a modified form of graduated support for the glass cutting slide;

Figure 9 is a plan view of the structure shown in Figure 8 but looking at the opposite face;

Figure 10 is a fragmentary edge elevation of the extremity of one leg of the structure shown in Figure 9;

Figure 11 is a section on the line 11—11 of Figure 8.

Referring to the structure shown in Figures 1 to 7, 10 designates a glass cutting table which may be provided with the legs 11. The margin of this table on two sides is lowered below the general surface of the table, as at 12, and formed with the longitudinally extending groove 13; these grooves 13 intersecting at the corner 14 of the table. The face of the table on two sides is provided with the graduated scales 15 and 16 disposed at right angles to each other, these graduations preferably being in fractions of an inch. These scales 15 and 16 extend upward slightly above the surface of the table 10 so that the sheet of glass A may be disposed against the edge faces of these scales.

The table, as shown in Figure 1, is provided with a plurality of slots 17, the margin of each slot being countersunk, as at 18. Adapted to be disposed in any one or more of the slots are clamping members, one of which is shown in detail in Figure 3. The clamping member comprises a slide 19 which at its forward end supports above the level of the table a block of hard fiber, designated 20 and riveted to the slide 19. A binding screw 21 extends upward through the slot 17 and has screw threaded engagement with the slide 19 there being a washer 22 between the head 23 of the binding screw and the under face of the table. With this structure, it is possible to clamp any size sheet of glass in position against the rules 15 and 16, while cutting the glass. These clamps are particularly intended for relatively small sheets but may be used on large sheets.

The slides 19 are removable from the slots so as to permit large sheets of glass to be placed upon the table and extend over these slots.

Designed to rest upon the face of the table and extend over the glass thereon, is a straight edge 24 in the form of a T-square and, therefore, provided with a head 25 at one end, this head being at right angles to the straight edge and designed to contact with the outer edge face of either of the rules 15 or 16. Preferably, this head 25 is formed with a tongue 26, as shown in Figure 2, which engages in the groove 13 so that the head is held from any accidental tilting with relation to the edge of the rule and held at all times with the blade or straight edge 24 at right angles to the side of the table.

Operating over the blade or straight edge 24, is a slide 27, shown in detail in Figure 4. This slide is made of metal and is formed with the lateral flanges 28 and 29 which snugly embrace the blade 24. Preferably, the slide will carry on its inner face the rollers 30 which are for anti-frictional engagement with the upper face of the blade 24.

Beyond the flange 29, the slide is provided with the upwardly extending, tubular, exteriorly screw threaded stem 31 upon which is screwed the knurled head 32. This end of the slide is formed with a recess 33 for the accommodation of the cutting element. Extending through the tubular stem 31 is a stem or shank 34 which at its lower end is formed to provide a disk like head 35 of the form shown in Figure 5. Disposed behind this head is the cutter carrier 36 carrying thereon a plurality of wheel cutters 37 having sharp edges. The peripheries of these cutters project slightly beyond the carrier 36 and the carrier 36 is mounted upon the head 35 by means of the screw 38. When this screw is tightened, it holds the carrier 36 firmly in place against rotation. When the screw is loosened, the carrier may be rotated to bring any one of its cutting wheels into cutting position. Thus, when one cutting wheel is worn another may be moved into position.

The rear face of the carrier 36 is preferably provided with numbers, one for each of the cutting wheels 37, whereby the carrier may be rotated to bring the desired cutting wheel into operative position. The shank 34 extends above the tubular stem 31 and head 32 and is provided with a head 39. A coil spring 40 urges this head upward so as to carry the cutter above the under surface of the straight edge blade 24. When it is desired to use the cutter after the straight edge blade has been adjusted to proper position, the cutter is depressed by forcing downward on the head 39 and the slide is shifted longitudinally which will cut the glass along a straight line. Preferably, an implement 41 for breaking off small strips of glass has its shank inserted within the end of the straight edge blade 24 and is thus retained conveniently for use when circumstances require.

In Figures 8 to 11, we have illustrated a modified form of our glass cutting devices in which a straight edge is used in combination with a graduated rule and in which the slide is mounted upon the straight edge. In these figures, 42 designates the straight edge upon which the slide 27 is mounted. At one end of the straight edge there is attached the outwardly extending stop 43 having its inner edge at right angles to the straight edge. The rule 44 is pivoted at 45 to the straight edge so that it may be turned either underneath and parallel to the straight edge or may be turned outward at right angles thereto. This rule 44 is provided with the graduations 46.

In order to hold the rule against the stop 43, we provide upon the rule 44, the outwardly and rearwardly projecting ear 47 which is formed with a short slot concentric to the pivot pin 46 and mounted upon the stop 43, is the upwardly projecting pin 48 provided with a clamping nut 49 at its upper end. Thus, when the ear 47 has been turned into engagement with the pin 48, the nut 49 may be clamped down and thus clamp the parts 42 and 44 at right angles to each other. It will be seen that the straight edge 42 is disposed on a level above the rule 44 equal to the thickness of a piece of glass so that thus the rule 44 may be laid against the edge of the glass and shifted to bring the straight edge in any desired relation to the opposite edge of the glass. The slide 27 may then be shifted along the straight edge with the cutter depressed and the glass will be cut along the line desired. By pivoting the rule 44 to the straight edge, the rule 44 may be turned into parallel relation and beneath the straight edge for convenience of carriage and the tip of the rule will be engaged by an angular clip 50 mounted upon the extremity of the straight edge upon the under face thereof, as shown in Figures 9 and 10.

A stop 51 limits the movement of the slide 27 in one direction on the straight edge and the slide 27 is provided with a short slot 27a to accommodate this stop pin 51. There is also a stop pin 24a in the structure shown in Figure 1, for limiting the movement of the slide, the slide being provided with the slot 27a as hereinbefore described.

It will be seen from Figure 1 that the head 25 of the straight edge blade is provided with a graduation mark 25a which is disposed directly in line with the cutting wheel 37 and that this index mark 25a is to be brought into alinement with the desired graduation on the rules 15 and 16 and that the cutter will cut along a line intersecting this graduation. A like line is designated 46a in Figure 8 and this line constitutes the end of a series of graduations on the rule 46.

The advantages of the structure shown in Figure 1 reside in the ease with which glass may be cut and the accuracy with which it may be cut to exact dimensions. The head 25 cannot be accidentally slanted with relation to the rules 15 or 16 because of the fact that the head has the tongue 26 which engages in the groove 13. Thus, the blade 24 is at all times held at right angles to the rules 15 or 16.

By means of the clamps 19—20, small pieces of glass may be clamped in place at the center of the board and smaller squares cut from these small pieces of glass or one edge of this small piece of glass may be trimmed off without any chance of the small piece of glass slipping. Of course, the clamps may also be used for large pieces of glass, as shown in Figure 1.

The cutter moving against the straight edge 24 cannot become inclined but is always held in position perpendicular to the face of the straight edge so that it will always cut properly and there will be no waviness in the line cut as is sometimes the case where a glass cutter is held in one hand and pressed against a straight edge.

In Figure 4, it will be seen that the knob or handle 32 is in the form of a sleeve having screw threaded engagement with the shank 31 and that this sleeve 32 bears against the underface of the spring 40. By adjusting this sleeve upward, the tension of the spring 40 may be increased and the extent of depression of the shank 34 and, therefore, of the cutter 37 may be adjusted. In other words, it is obvious that if the knob 32 or sleeve were rotated upward so as to fully compress the spring 40, that no downward movement of the cutter could take place. If the knob is adjusted so as to compress the spring 40 one-half only, a limited downward movement of the cutter can be secured and thus by adjusting this knob 32, the extent of undue depression of the cutter is prevented. This is particularly necessary where thin glass is to be cut and where the operator is likely to depress the cutter with too great force.

It will be seen that while we have shown six cutters on the cutter carrier 36, yet this number may be varied, if desired, and that diamonds may be used in place of the cutting wheels. Of course, it will be further understood that the cutting appliance shown in Figures 8 and 9 does not require and is not intended to be used with the table 10 but that this cutting appliance may be used on any table or other flat surface.

With this structure, it will be seen one person can cut large pieces of glass accurately without the necessity of pressing downward to hold the glass in place or marking the glass at opposite edges in order to hold the straight edge accurately. While we have illustrated certain particular details, we do not wish to be limited thereto except as defined in the appended claims.

We claim:—

1. A glass cutting appliance including a table, graduated rules disposed on two sides of said table at right angles to each other, the middle portion of the table being formed with a plurality of slots each extending at right angles to an edge of the table, the slots being angled with relation to each other, glass clamping members movable in said slots toward or from each other, and having means whereby they may be clamped in position, the clamping members being removable entirely from said slots and a straight edge blade movable over said table and having a head at one end at right angles to the blade and adapted to bear against one or the other of said rules, means for preventing the head from being tilted with relation to the side edge of the table and a slide mounted upon said straight edge blade and having a manually depressible glass cutter.

2. In a glass cutting appliance, a rule, a slide movable therealong, a cutter including a shank mounted for vertical movement on the slide, a spring urging the shank upward and an adjustable member disposed between the spring and slide and limiting the downward movement of the shank.

3. A glass cutting appliance including a rule, a slide mounted on the rule and having a part projecting laterally beyond the rule, the laterally projecting portion extending downward and having a recess on its underface open at its lower end and upon its outer face, the laterally projecting portion having an upwardly extending tubular stem, a tubular element having screw threaded engagement with the stem, a shank extending upward through the stem and having a head at its upper end and a cutter carrying head at its lower end, and a spring urging the shank upward and normally holding said cutter head within said recess and above the underface of the rule, the tubular element being adjustable upon the stem to adjustably limit the downward movement of the shank and cutter carried thereby.

4. A glass cutting appliance including a rule, a slide mounted on the rule and projecting laterally beyond the rule, the laterally projecting portion of the slide having an upwardly extending tubular stem, a shank extending upward through the stem and having a head at its upper end, and a cutter at its lower end, a spring urging the shank upward and normally holding the cutter above the lower face of the rule, and means for adjustably limiting the downward movement of the cutter.

PHILIP F. MARSELLA.
FERDINANDO MARSELLA.